United States Patent Office 3,418,976
Patented Dec. 31, 1968

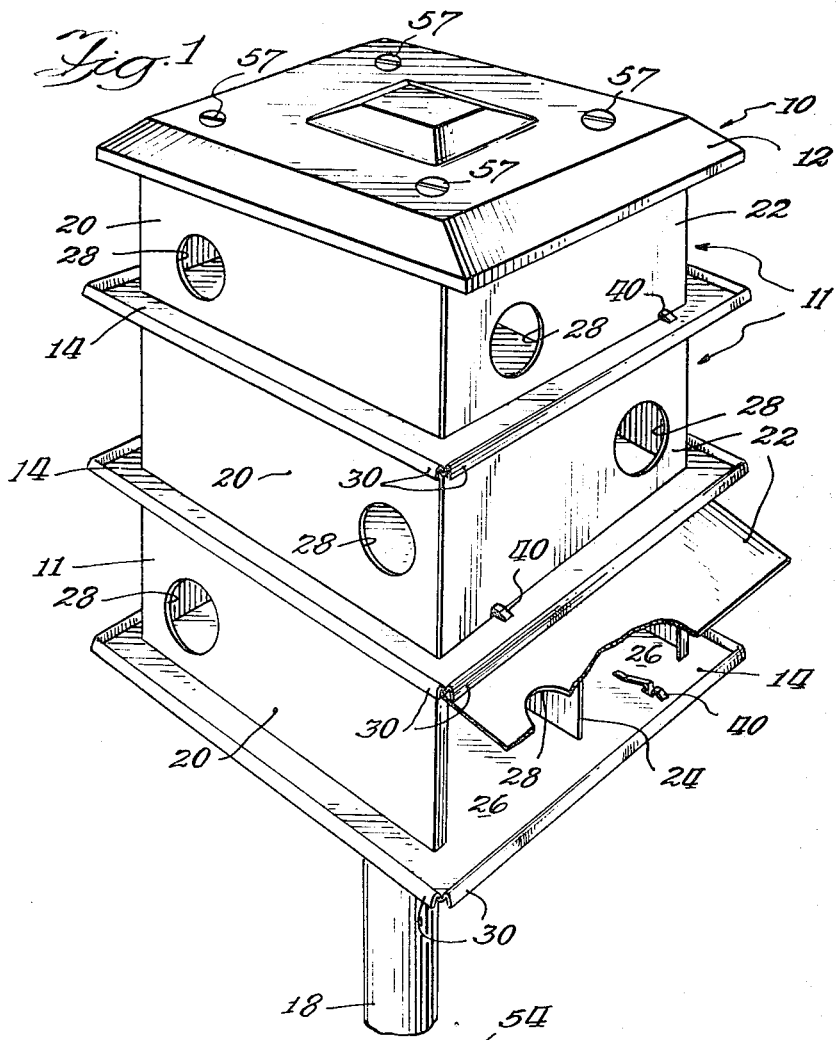
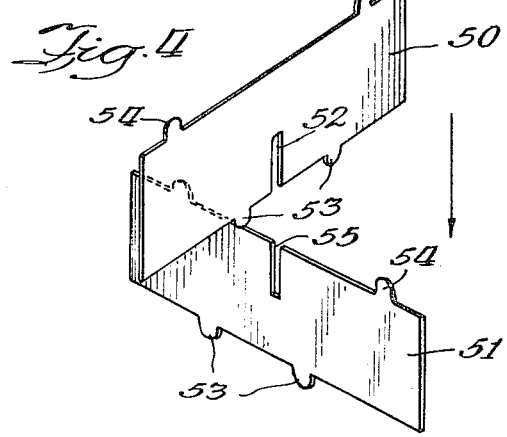

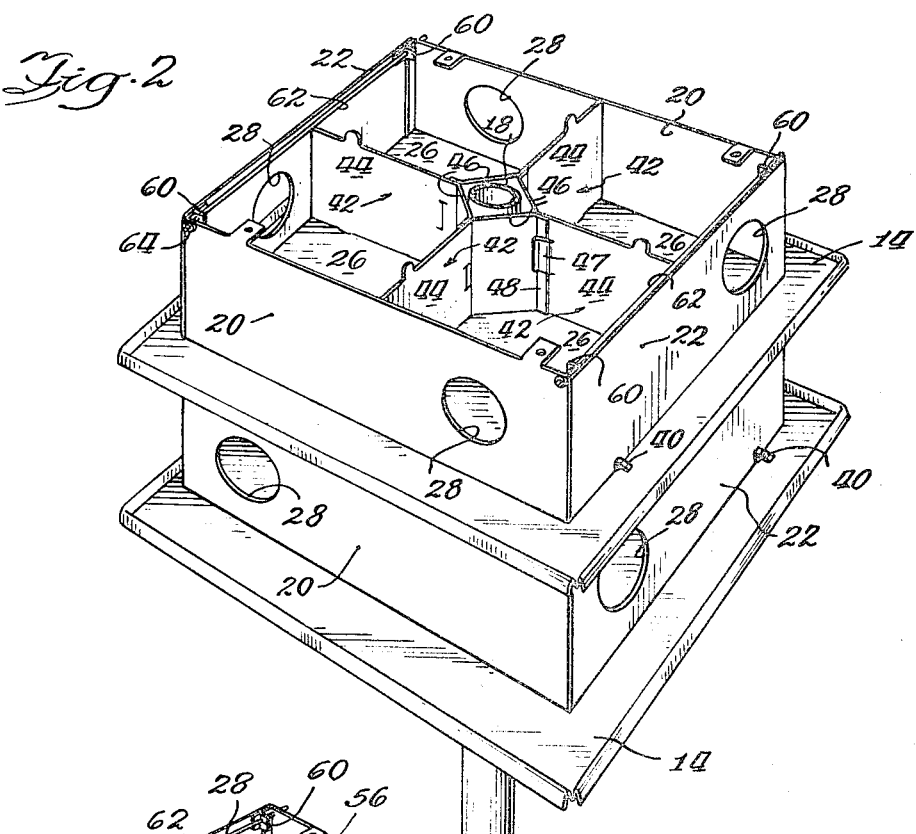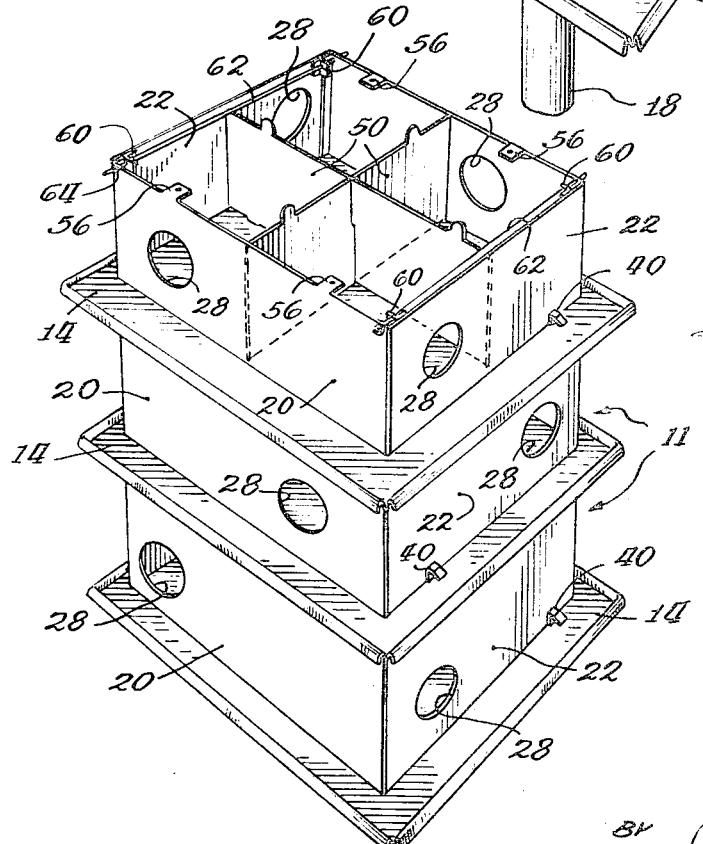

3,418,976
BIRDHOUSE
Arthur E. Vail, Griggsville, Ill., assignor to Trio Manufacturing Company, Griggsville, Ill., a corporation of Illinois
Filed Dec. 6, 1966, Ser. No. 599,619
5 Claims. (Cl. 119—23)

ABSTRACT OF THE DISCLOSURE

A four-sided birdhouse including at least one tier divided into a plurality of nesting compartments. Said one tier including a floor, outer wall structure comprised of, a first pair of spaced parallel wall panels fixedly attached to said floor, and a second pair of parallel wall panels hingedly attached between and to the opposite ends of said fixedly attached panels, inner wall structure associated with said outer wall structure to divide the space enclosed thereby into four nesting compartments. The inner wall structure being comprised of a plurality of identically shaped structural elements, each having a planar wall portion serving as a common wall for adjacent compartments, and unitary male and female type connecting means on the inner portion thereof; whereby when assembled, the female type connecting means of one of said elements receives the male type connecting means of the element disposed on one side thereof, while the male type connecting means of said one element is received by the female type connecting means of the element disposed on the opposite side thereof. An entrance aperture in each of said hingedly and affixedly attached wall panels, said apertures being located so that an entrance to a nesting compartment is on each of the four sides of the birdhouse, thus assuring that the paths of arrival and departure of the birds to their respective nesting compartments do not interfere. In addition, where a multi-tiered arrangement is employed, the entrance apertures in the wall panels of the adjacent tiers on the same side of the house being offset with respect to each other to further ensure that paths of arrival and departure of the birds do not inerfere.

This invention relates generally to a multi-compartment birdhouse, and more particularly is directed to a birdhouse construction wherein each nesting compartment is provided with an individual balcony and a path of arrival and departure that is separate and distinct from those of the other nesting compartments.

The birdhouse of the present invention has been specifically designed with the purple martin in mind and is intended to provide a birdhouse that is pleasing to the eye and effective in attracting these birds as occupants. The martin is a gregarious species and a prodigious and effective destroyer of flying insects, especially mosquitos. Martins will catch these flying insects while on the wing and immediately return to the birdhouse to feed the insects to their young. The average martin has been known to destroy upwardly of 2,000 mosquitos daily in this manner. As the public is becoming more aware of the beneficial nature of these birds, various organizations and civic groups have embarked upon campaigns to erect birdhouses in the hope of attracting colonies of martins to residential areas to aid in insect control.

Martins are a vigorous and energetic bird and quite particular as to the construction of the birdhouse they choose to occupy. The martin will winter in the equatorial regions and will migrate north for the summer months, and, if the birdhouse is suited to their liking, will return year after year to the same house.

During the daylight hours the martin is constantly on the wing in search of food and will make enumerable trips back to the birdhouse to feed its young. Observance of these birds indicates that the martin prefers a birdhouse location and construction that provides a path of arrival and departure that is unobstructed by trees, poles, etc., but most important, unobstructed by the paths of arrival and departure of the other birds nesting in the birdhouse. Further observance of these birds, indicates that the martin abhors overcrowded conditions and prefers individual balconies and perch arrangements.

In United States Reissue Patent No. 25,878, issued to Arthur E. Vail, Oct. 12, 1965, there is described and claimed a birdhouse especially designed for martins. The birdhouse disclosed therein is provided with hinged cleanout doors so that the birdhouse owner may clean individual compartments to remove the nests and debris that may be left by other occupants. This is an important and desirable feature of any martin house, since martins will not nest unless the compartments are clean and spacious, or, if sparrows or other non-migratory birds occupy any of the other nesting compartments of the birdhouse.

Thus, birdhouse owners are, by necessity, required to make repeated inspections to assure the cleanliness of their birdhouse and to remove the nests of undesirable occupants. The hinged cleanout doors as disclosed in the above mentioned U.S. patent have proven to be an extremely beneficial aid in the maintaining of a birdhouse that is attractive to martins. But, while being attractive to martins in some respects, the aforementioned birdhouse has proven undesirable in others, in that birds are crowded onto the two sides of the house, necessitating that many of them must share the same balcony and perch. Also, in their flight to and from the house, their respective paths would often cross and this has proven to be a bothersome feature to these free flying birds.

Accordingly, the primary object of the invention is to provide a multi-compartment birdhouse that has the entrances to the nesting compartments so spaced such that the paths of arrival and departure of the birds to their respective nesting compartments do not interfere.

Still another object of this invention is to provide a multi-compartment birdhouse that will provide a separate balcony and perch for each nesting compartment.

Other objects and advantages will occur to those skilled in the art as a description of the invention proceeds in connection with the attached drawings of a preferred embodiment in which:

FIG. 1 is a perspective view of a three tier birdhouse embodying the invention, with one of the clean-out doors of the lowermost tier illustrated in the open position exposing to view the inner wall structure and the construction of the latch 40.

FIG. 2 is a perspective view of the birdhouse illustrated in FIG. 1 with the uppermost tier and roof removed and illustrating one form of inner wall construction.

FIG. 3 is a perspective view of the birdhouse of FIG. 1 with the roof removed and illustrating the uppermost tier which utilizes still another form of inner wall construction.

FIG. 4 is an exploded view in perspective of the members that make up the inner wall construction of tier illustrated in FIG. 3.

In FIG. 1 there is illustrated a sheet metal birdhouse 10 designed in accordance with the present invention. The particular birdhouse illustrated is of four-sided configuration and constructed of three tiers 11, with four nesting compartments in each tier. The superposed tiers 11 are offset with respect to each other, such that the nesting compartment openings of any given tier are not immediately above or below the openings of the adjacent tiers. Obviously, more than three tiers can be used provided this staggered relationship is maintained.

The illustrated form of the invention shows three tiers 11, a roof 12, a floor 14 for each tier and a mounting pole or post 18 for supporting the birdhouse. The outer wall structure of each tier 11 of the birdhouse is comprised of a pair of spaced parallel wall panels 20 which are fixedly attached to their respective floor members 14. Pivotally attached to the respective ends of the fixedly attached wall panels 20 are cleanout doors or panels 22. The cleanout doors 22 are hinged along their upper edge to the stationary panels 20 in any suitable manner, but, are preferably attached as illustrated in FIGS. 2 and 3.

The respective tiers 11 are detachably secured together by the use of nut and bolt arrangements (not shown) which fixedly attach the lower edges of the stationary panels 20 to the floor 14 and extend therethrough to engage the upper edge of the stationary panel on the adjacent lower tier. Thus, the floors 14 of the intermediate uppermost tiers serve a dual purpose in that they also define the upper extremities of the nesting compartments of the adjacent lower tiers.

With the cleanout doors 22 pivotally mounted, and the interior of the birdhouse divided up into four nesting compartments, as illustrated in FIGS. 2 and 3, access to the individual compartments for cleaning is provided for by the opposed pivotally mounted doors or panels 22. In FIG. 1 one of the cleanout doors 22 of the lowermost tier is shown in the open position exposing to view a portion of the inner wall structure, which is designated generally 24, and which divides the interior of the birdhouse into four separate and distinct compartments 26.

The floors 14 extend outwardly beyond their respective wall panels 22 on all four sides of the birdhouse to provide balconies for the birds. The peripheral edges of the floors 14 are provided with return bend flanges 30 which provide perches for the birds. Also provided in each of the floor elements 14 are latch means 40 which releasably engage the cleanout doors 22 when they are in the closed position. This latch means may take various forms, in that it may be constructed as a spring finger type, such as illustrated in FIG. 1, or may be comprised of a protuberance in the floor, as described and illustrated in U.S. Reissue Patent 24,878. Whatever type of latch means chosen is immaterial, and the specific latch means 40 illustrated comprises no part of the present invention.

Entrance passageways for the birds to the individual nesting compartments are provided by the apertures 28 in the respective panels 20 and 22. Obviously, the wall panels on the opposite side of the house (not shown) are also provided with entrance apertures 28, similar to those illustrated in FIG. 1. The spacing of the apertures in the respective panels is such that only one aperture 28 is provided in each outer wall panel and opens into only one nesting compartment, as more fully detailed hereinafter.

FIG. 2 is a perspective view of the birdhouse with the uppermost tier removed and exposing to view the details of the inner wall construction of the intermediate tier. The interior of this tier and the lowermost tier are divided into four nesting compartments by the internal wall structure 24, which is comprised of interlocked inner wall structural elements 42. Each structural element 42 has a planar wall 44 which serves as a common side wall for adjacent nesting compartments. Attached to each of the planar walls 44 and disposed at an angle thereto are intermediate wall sections 46. The inner wall structural elements 42 are provided with means whereby they may be interengaged such that their respective intermediate walls 46 define an enclosed area 48 which cooperates with an aperture (not shown) in the floor 14 to provide a space for the reception of the mounting pole 18. The interlocking means illustrated is comprised of integral open end portion 47 strucked out of the planar wall surface 44, and which is adapted to receive a tab 48 on the end of the intermediate wall section 46 of an adjacent structural element. This specific type of connecting means has been shown for illustrative purposes only and does not constitute a part of the invention. It is obvious, and anticipated, that other forms of interconnecting arrangements may be used.

FIG. 2 further illustrates the positioning of the entrance apertures 28 in the outer wall panels 20 and 22, respectively. The apertures 28 are arranged so that those in the cleanout panels 22 provide entrances to two diametrically opposed nesting compartments. The apertures 28 in the stationary panels 20 are similarly arranged to provide entrances to the remaining two nesting compartments. With the apertures 28 situated in this manner it can be appreciated, from FIG. 2, that a full section of balcony is provided for each nesting compartment 26, thus obviating the problem of overcrowding. Further, as the martins make their repeated trips to and from the nests with food for their young, there is little danger that their respective paths will cross since there is but one entrance on each side of the house, and those of the adjacent tiers are staggered with respect thereto.

In the illustrative form of the invention, all of the tiers are detachably secured together and the two lowermost tiers are provided with inner wall structures which define a reception space for the mounting pole. It has been found that with the mounting pole telescopically received within the two lowermost tiers, sufficient rigidity is achieved and there is no need to extend the pole through the entire house. Further, since the respective tiers are detachably secured together this construction permits the birdhouse owner to buy a basic two tier assembly, and to later add on as many additional tiers as he so desired.

Accordingly, there is no need to provide the uppermost tier structure with a reception space for the mounting pole. In FIG. 3 there is illustrated a preferred form of inner wall construction that defines the nesting compartments of the upper tier 11. The outer wall structure of this tier is identical to that of the two lowermost tiers and has been numbered accordingly.

The primary difference in the arrangement of the upper tier or tiers lies in the construction of the structural members that divide the area enclosed by the outer wall sections into the four nesting compartments. Since no reception space for the mounting pole 18 is contemplated, there is no need for the intermediate wall sections 46 of the previously discussed inner wall construction. The inner walls are essentially formed of only two panels 50 and 51 which are attached to the floor 14 and are interconnected in what is commonly termed "egg-crate" fashion, as illustrated in FIGS. 3 and 4. The interconnected inner wall panels 50 and 51 are positioned perpendicular with respect to the outer wall panels 20 and 22 so as to divide the enclosed area into four nesting compartments 26. The entrance apertures 28 are positioned therein in the same manner as discussed with regard to the two lowermost tiers, viz., only one entrance aperture 28 being provided in each panel and these being offset with respect to those of the adjacent lower tier.

The "egg-crate" engagement or connection of the inner wall panels 50 and 51 is illustrated in FIG. 4. The wall panel 50 is provided with a slot 52 in the lower edge thereof. The wall panel 51 is provided with a similar slot 55 in the upper edge. The inner wall panels 50 and 51 are interlocked, as illustrated in FIGS. 3 and 4, with their respective slotted portions engaged to define the inner wall structure.

The panels 50 and 51 are provided with tabs 53 along the lower edge thereof which are received in apertures provided in the floor 14 to position and affix the panels 50 thereto. The upper edges of the panels 50 and 51 are provided with tabs 54 which upon final assembly of the illustrated modification of the invention are not used since the roof 12 is held in place by bolts 57 which are engaged with the brackets 56 on the stationary panels 20. But, if it is desired to add an additional tier to the birdhouse the tabs 54 are adapted to cooperate with apertures in the floor of the additional tier to serve as positioning and holding means for the panels and said additional tier. Bolts are then passed through the floor of the additional tier and attached to the brackets 56 to complete the assembly.

The preferred manner of pivotally mounting the clean-out doors or panel 22 is illustrated in FIGS. 2 and 3. Each panel 22 is provided with a pair of brackets 60. A support rod 62 is passed through aligned apertures in the stationary panels 20 and through apertures in the brackets 60. The positioning of the support rods 62 with respect to the panels 20 and 22 is maintained by fitting snap-nuts 64 over the opposite ends of the rods. With this arrangement the clean-out doors or panels 22 are free to pivot about the rods 62 as a horizontal axis.

It must be understood that the number of tiers used is a mere matter of choice on the part of the birdhouse owner and that the illustrated form is in no way intended to limit the invention. Further, if desired, all of the tiers may be provided with inner wall structure which provides a space for the reception of the mounting pole, or all of the tiers may be as illustrated in FIG. 3 with the mounting pole 18 firmly attached to the underside of the floor of the lowermost tier. The use of a reception space in the lowermost tiers to telescopically receive a mounting pole has proven, in practice, to be effective and is merely illustrative of but one form of mounting the birdhouse.

Accordingly, it is anticipated that those skilled in this art are capable of making numerous variations without departing from the spirit or scope of the invention as defined in the appended claims.

What is desired to be secured by Letters Patent of the United States is:

1. A four-sided birdhouse including at least one tier having a plurality of nesting compartments and comprising: a floor; outer wall structure including a first pair of spaced parallel wall panels fixedly attached to said floor and a second pair of parallel wall panels hingedly attached between and to the opposite ends of said fixedly attached wall panels to provide access means to said nesting compartments; inner wall structure associated with said outer wall structure to divide the space enclosed by said outer wall structure into four nesting compartments, said inner wall structure comprised of a plurality of identically shaped structural elements which cooperate to define said individual compartments, each of said elements including a planar wall section serving as a common wall for adjacent compartments and unitary male and female type connecting means provided on said element approximate the inner portion thereof, each of said identically shaped elements positioned whereby said female type connecting means receive the male type connecting means of the element disposed on one side thereof while the male type connecting means is received in the female type connecting means of the element disposed on the other side thereof; and means defining the upper extremities of said compartments; an entrance aperture in each of said hingedly and affixedly attached wall panels and located thereon so that one entrance to a nesting compartment is on each of the four sides of the birdhouse, thus assuring that the paths of arrival and departure of the birds to their respective nesting compartments do not interfere.

2. A birdhouse as defined in claim 1 wherein each of said identically shaped structural elements includes an intermediate wall section, such that upon assembly said intermediate wall sections cooperate to define an enclosed area in the center of the birdhouse separate from the respective nesting compartments, and aperture means in said floor aligned with said enclosed area to provide a reception space for mounting pole.

3. A birdhouse as defined in claim 2 wherein said house includes a plurality of tiers in superposed relationship with at least the first two of said tiers being provided with said reception space for a mounting pole.

4. A birdhouse as defined in claim 1 wherein said house includes at least three tiers in superposed relationship with the means defining the upper extremities of the nesting compartments of the uppermost tier including a roof member, the means defining the upper extremities of the nesting compartments of the remaining tiers including the floor of the next adjacent tier, the uppermost tier being provided with inner wall structure comprised of a pair of interconnected panels which have their planar surfaces disposed at right angles with respect to each other, said pair of panels being attached to the floor and cooperating with the outer wall structure to divide the tier into four nesting compartments.

5. A birdhouse as defined in claim 1 wherein said birdhouse includes a plurality of tiers in superposed relationship with the entrance apertures in the wall panels of the adjacent tiers on the same side of the house being offset with respect to each other.

References Cited

UNITED STATES PATENTS

| 1,916,878 | 7/1933 | Anklam | 119—23 |
| 2,915,040 | 12/1959 | Ward | 119—23 |
| 3,078,826 | 2/1963 | Bear | 119—23 |
| 3,111,934 | 11/1963 | Vail | 119—23 |
| 3,135,239 | 6/1964 | Bartolotta | 119—23 |

HUGH R. CHAMBLEE, *Primary Examiner.*